United States Patent

[11] 3,628,186

| [72] | Inventors | Arthur Ashkin<br>Rumson;<br>John E. Bjorkholm, Middletown, both of N.J. |
|---|---|---|
| [21] | Appl. No. | 808,767 |
| [22] | Filed | Mar. 20, 1969 |
| [45] | Patented | Dec. 14, 1971 |
| [73] | Assignee | Bell Telephone Laboratories, Incorporated<br>Murray Hill, N.J.<br>Continuation-in-part of application Ser. No. 728,667, May 13, 1968. This application Mar. 20, 1969, Ser. No. 808,767 |

[54] PARAMETRIC OSCILLATOR WITH NONRESONANT SIGNAL
7 Claims, 4 Drawing Figs.

[52] U.S. Cl. ..................................... 331/107 R,
307/88.3, 330/4.5, 331/74, 331/94.5, 331/96, 331/175
[51] Int. Cl. ............................................. H03f 7/04
[50] Field of Search........................................ 307/88.3;
330/4.5; 331/107

[56] References Cited
UNITED STATES PATENTS

| 3,398,294 | 8/1968 | Groschwitz | 307/88.3 |
| 3,461,403 | 8/1969 | Patel et al. | 307/88.3 |
| 3,469,107 | 9/1969 | Townes et al. | 307/88.3 |
| 3,502,958 | 3/1970 | Fleury et al. | 307/88.3 |
| 3,515,897 | 6/1970 | Culver | 307/88.3 |

Primary Examiner—Roy Lake
Assistant Examiner—Darwin R. Hostetter
Attorneys—R. J. Guenther and Arthur J. Torsiglieri ABSTRACT: Continuous-wave and pulsed optical parametric oscillators are disclosed in each of which the optical cavity is resonant for the idler and nonresonant for the signal. Two of the disclosed oscillators employ a nonlinear crystal placed within the pumping laser resonator; and at least one of the pump reflectors is highly transmitting for the signal radiation. One of the oscillators is designed so that oscillation may be achieved on a continuous-wave basis; the other is designed for pulsed or continuous-wave mode-locked operation in which the output consists of a train of short pulses. The other disclosed oscillator employs a nonlinear crystal in a cavity resonant for idler radiation and external to the cavity of the pumping laser. Various arrangements to affect tuning of the oscillators are disclosed.

INVENTORS: A. ASHKIN
J. E. BJORKHOLM
BY
ATTORNEY

PARAMETRIC OSCILLATOR WITH NONRESONANT SIGNAL

BACKGROUND OF THE INVENTION

This is a continuation-in-part of copending application Ser. No. 728,667 filed May 13, 1968, and relates to optical parametric oscillators.

As used herein the term "optical" refers to radiation having wavelengths which are substantially shorter than the length of the crystal exhibiting the bulk, distributed, nonlinear effect. In other words, we are concerned with phase-matched traveling-wave parametric devices whose wavelengths can in fact span the spectrum from ultraviolet to the far infrared and short wavelength microwave regions. We shall hereinafter refer to such a crystal employed in such a device simply as a nonlinear crystal.

Great emphasis upon achieving oscillation threshold is quite evident in the technical literature on optical parametric oscillators. As one example, see the article "Theory of Parametric Oscillator Threshold with Single-Mode Optical Masers and Observation of Amplification in $LiNbO_3$," by G. D. Boyd and A. Ashkin, *The Physical Review*, 146, 187 (June 3, 1966). This emphasis has occurred quite naturally because optical parametric oscillation threshold has been difficult to achieve, especially on a continuous-wave basis.

One result of the effort to achieve threshold is that simultaneous resonance of signal and idler in an optical parametric device has been considered not only desirable but also an indispensable condition for parametric oscillations.

Unfortunately, for an oscillator in which both signal and idler are resonant, continuous tuning of the signal frequency requires that at least three oscillator parameters be accurately varied, as explained in the above-cited article. In practice, however, it is extremely difficult to make such detailed adjustments, and only one variable such as crystal rotation or temperature is typically used to achieve quasi-continuous tuning. For an oscillator in which signal and idler are resonated, there are tuning discontinuities involving gaps as broad as many times the axial mode spacing of the oscillator. See "Optical Parametric Oscillation in $LiNbO_3$" by J. A. Giordmaine and Robert C. Miller in *Physics of Quantum Electronics*, edited by P. L. Kelley, B. Lax, and P. E. Tannenwald (McGraw-Hill, N.Y. 1966) page 31.

Another very significant problem associated with prior art parametric oscillators is power-dependent reflections, also termed induced reflections, of pumping radiation. See, "Nonlinear Optical Effects: An Optical Power Limiter," by A. E. Siegman, *Applied Optics* 6, 739 (1962). This reflection 6, because in prior art oscillators both the signal and idler are made to be resonant (i.e., a doubly resonant oscillator or DRO) within a single cavity resonator in order to reduce the oscillation threshold. However, because the signal and idler are phase matched and are simultaneously reflected from the resonator mirrors, backward-traveling signal and idler waves mix to generate a backward-traveling pump wave which is equivalent to a reflection of pump radiation. The reflection is considered to be power-dependent inasmuch as the power of backward-traveling pump radiation increases as the incident pump power is increased, and is disadvantageous for at least two reasons: first, it produces an undesirable reaction of the parametric oscillator back upon the source of pump power necessitating the use of an isolator, and, secondly, it causes poor overall efficiency.

The efficiency of a doubly resonant parametric oscillator (DRO) with power-dependent reflections is best understood in the context of the power limiting which inherently occurs in the amount of pump power transmitted through the oscillator. More specifically, it is known that regardless of the input pump power above threshold, the pump power transmitted by the oscillator is limited or clamped to the threshold power level. The residual input power is partly converted into signal and idler and partly converted disadvantageously into the aforementioned backward-traveling pump wave. Maximum theoretical efficiency in a DRO with power-dependent reflections is 50 percent and is obtained when the input pump power is four times the threshold. Pumping harder only reduces the efficiency because the power-dependent reflections grow more rapidly as $P/P_t$ (the ratio of input pump power to threshold power) is increased than does the signal and idler power.

SUMMARY OF THE INVENTION

We have discovered that is is possible to achieve optical parametric oscillation with a nonresonant signal. The advantages of oscillation with a nonresonant signal are better tunability, increased efficiency, and lack of a reaction of the oscillator back on the source of pumping power.

Of course, it should be understood that in a parametric oscillator two radiations are generated and that either one can be called the signal, the other the idler. Hereinafter, we shall term the nonresonant generated radiation the signal, even though this contradicts in some cases the prior art conventions concerning the designation of the two generated radiations. It may be further noted that, in the event of the use of a multimode pump, it is possible for the nonresonant signal to be generated in a corresponding number of modes, while the resonant idler is generated only in a single mode.

Specifically, to achieve a nonresonant signal and resonant idler, at least the idler reflector farthest from the pumping source is adapted to transmit the signal substantially completely or is associated with other means for removing the signal radiation from the idler resonator.

Because only the idler, and not both idler and signal, is resonant in the oscillator resonator, no mixing action occurs to generate a backward-traveling pump wave. Consequently, power-dependent reflections are virtually eliminated and the limiting action of prior art devices is no longer present, i.e., the pump power transmitted by the oscillator is not clamped to the threshold power. Several advantageous properties result. First, elimination of the power-dependent reflections eliminates any reaction of the oscillator back on the source of pump radiation. Secondly, the oscillator more efficiently converts the pump radiation into signal and idler radiation. In fact, 100 percent theoretical efficiency occurs at finite power levels. More specifically, it occurs at $P/P_t$ equal to approximately $(\pi/2)^2$, a feature not attainable in prior art DROs with power-dependent reflections.

It should be noted that the power-dependent reflections can be eliminated not only in a singly resonant oscillator (SRO) as in the present invention, but also in a ring-type DRO in which the signal and idler do not propagate through the nonlinear crystal in the backward direction under phase-matched conditions. Such a ring-type DRO is disclosed in copending application, Ser. No. 736,690, filed on June 13, 1968, of applicants and assigned to applicants' assignee.

BRIEF DESCRIPTION OF THE DRAWING

Further features and advantages of our invention may be understood from the following detailed description, taken together with the drawing, in which.

DESCRIPTION OF ILLUSTRATIVE EMBODIMENTS

Figure 1:
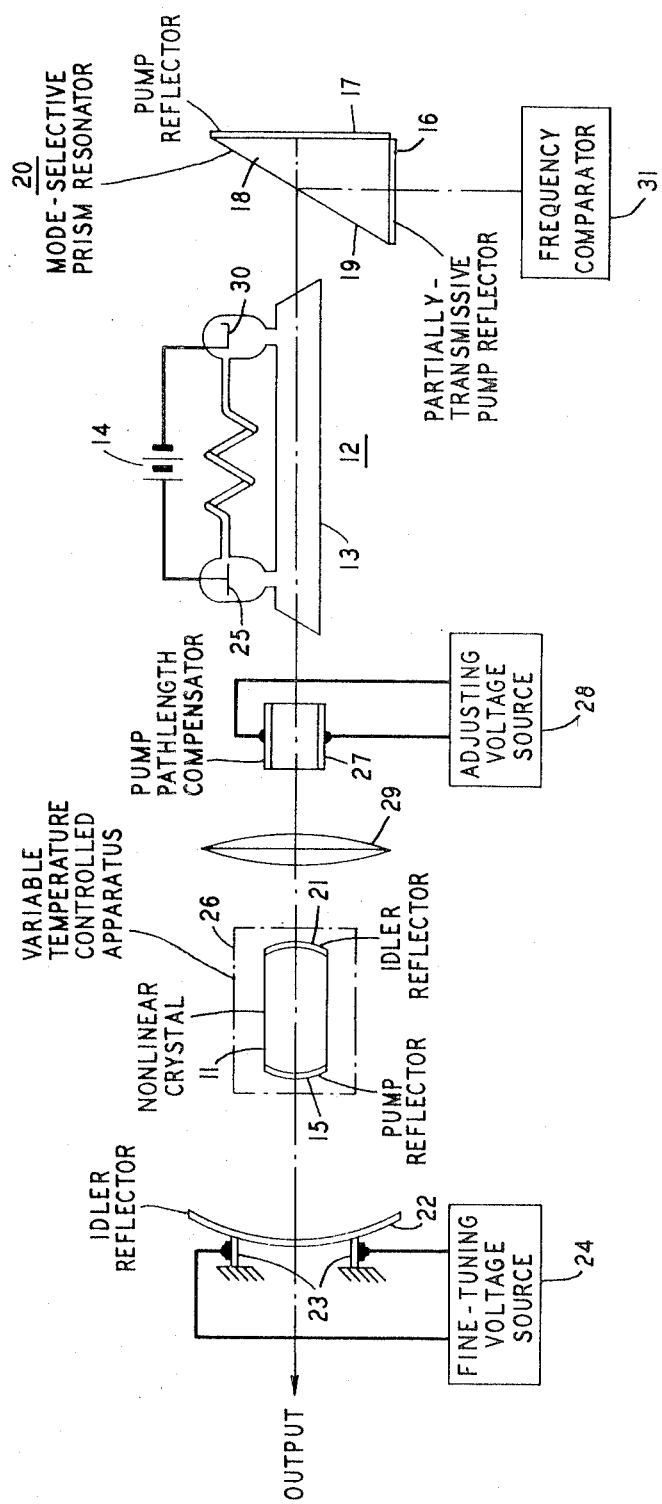
FIG. 1 is a partially pictorial and partially block diagrammatic illustration of an illustrative embodiment of the invention that is particularly well suited for continuous-wave oscillation.

The parametric oscillator of FIG. 1 is particularly well suited for obtaining tunable parametric oscillation with a nonresonant signal by using a continuous-wave pump. The nonlinear crystal 11, which is illustratively barium sodium niobate ($Ba_2NaNb_3O_{15}$), is placed inside the resonator of the pump laser 12, operating at about 5,000 A. The oscillations are generated by the pump radiation which, for example, could be the continuous-wave radiation from an argon ion laser 12. The laser resonator, which is the pump resonator with respect to the parametric oscillator, is formed by reflector 15 mounted near or upon the more distant end of nonlinear crystal 11 with respect to the laser active medium 12 and by the mode-selective prism resonator 20, disposed with respect to reflector 15 to have a common axis extending through the active medium in envelope 13.

In order to provide mode selection among the various axial modes obtainable with the argon laser, a small auxiliary resonator 20 is formed by mounting reflector 16 and reflector 17 upon orthogonal surfaces of a prism 18. Prism 18 may be fused quartz, in which case an inclined surface 19 will provide partial internal reflection in prism 18 to complete the auxiliary resonator 20. The use of such an auxiliary prism resonator is more fully explained in the copending patent application of W. W. Rigrod, Ser. No. 627,493, filed Mar. 31, 1967, and assigned to the assignee hereof.

The idler resonator for the parametric oscillator is formed by the reflector 21 disposed near or upon the end of crystal 11 opposite reflector 15 and by the axially movable reflector 22. Reflector 22 is mounted upon an annular piezoelectric element 23 which is driven by fine tuning source 24 to change the axial position of reflector 22.

Reflectors 15, 21, and 22 are multiple-dielectric mirrors that are designed to have specific reflection characteristics. Reflector 15 is highly reflecting for pump radiation and highly transmitting for signal and idler radiation. Reflector 21 is highly transmitting for pump radiation and for signal radiation and high reflecting for idler radiation. Reflector 22 is highly transmitting for signal radiation and highly reflecting for idler radiation.

Crystal 11 is mounted in a temperature-controlling apparatus 26 which is adapted to variably control the temperature of crystal 11 to provide rough tuning of the oscillator phase-matching condition and thereby the idler and signal frequencies, which must add to equal the pump frequency. Since this temperature tuning will change the optical path length of the pump radiation, the pump path length compensator 27, illustratively an electro-optic modulator suitable for use around 5,000 A. is mounted in the pump radiation path with its z axis aligned parallel with the laser axis and is driven through suitable electrodes from the adjusting voltage source 28 to maintain the pump path length constant as the temperature in apparatus 26 changes. The pump radiation may or may not be focused into crystal 11 by a suitable lens 29.

Our invention is illustratively implemented in the embodiment of FIG. 1 by the particular choice of reflection characteristics of reflectors 15, 21, and 22. The signal radiation propagating to the right from crystal 11 can be extracted from the pump resonator at any suitable point or can be absorbed. For example, reflector 17 could be made transmissive to the signal. The two oppositely propagating signal radiations may be combined by a suitable beam combiner if the signal radiation is to be utilized. In all such cases, the reflectors 15, 21 and 22 may remain the same.

In order to achieve tunability over a wideband, idler reflectors 21 and 22 are illustratively provided with high reflectivities from $1.0\mu$ to substantially longer wavelength and with high transmissivities from 0.49 to $0.99\mu$, in the case of a pump wavelength of $0.5\mu$. Reflector 15 is provided with sharply peaked reflectivity around $0.5\mu$, for example, from 0.49 to $0.51\mu$.

In the operation of the embodiment of FIG. 1, the argon ion pumping laser is illustratively operated to provide continuous-wave radiation at $0.5\mu$ in a single longitudinal mode as selected by prism resonator 20. In practice the exact identity of this mode can be assured by a feedback control system deriving its signal from a frequency comparator 31 and tuning the pump resonator, for example, by modifying the voltage applied to compensator 27. Alternatively, a manual adjustment may be made in response to comparator 31.

The $BaNaNbO_3$ crystal 11 is illustratively oriented with its optic axis orthogonal to the common axis of the resonators in FIG. 1 in order to provide phase matching of pump, signal and idler radiations without double refraction. Nevertheless, this orientation need not be employed. Coarse tuning of the signal frequency is provided by changing the temperature within the apparatus 26; and fine tuning is provided by varying the voltage provided from source 24 to piezoelectric element 23 to move reflector 22. Insofar as the temperature changes the pump path length in crystal 11, the voltage from source 28 is manually adjusted to provide the opposite increment of change in pump path length in compensation electro-optic element 27. A normal substantial bias upon the element 27 is therefore employed.

Alternatively, coarse tuning could also be achieved by rotation of crystal 11.

Even in the absence of fine tuning of the idler reflector 22, the overall tuning characteristics of this parametric oscillator based solely on variation of temperature will be much better controlled than previous doubly resonant oscillators which exhibit the broad gaps in tuning, as described above. The gaps will be less than one half the axial mode spacing of the oscillator.

Even these gaps can be eliminated by fine tuning. Thus, only two variable parameters are needed for continuous tuning, as contrasted to the three variable parameters required when signal and idler are simultaneously resonant.

In cases where the fine tuning is not employed, one can eliminate the mode selective prism and pump the oscillator with a multifrequency (multimode) pump source. This is accomplished by replacing the mode selective prism 20 in FIG. 1 by a simple mirror at the pump wavelength. Multiple signal frequencies are accommodated since there is no signal resonator.

Figure 4:
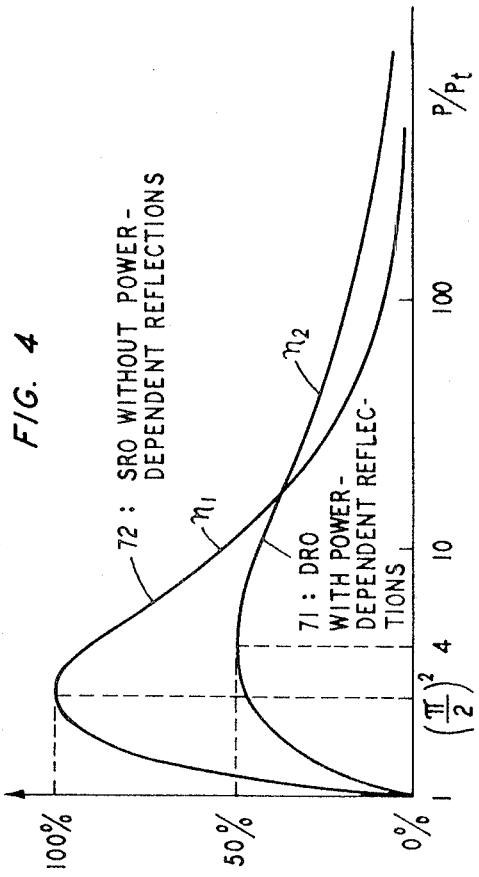

The most important aspect of the embodiment of FIG. 1 is that the signal radiation is not resonant in the oscillator cavity formed by mirrors 21 and 22 because mirrors 15 and 22 are nonreflecting for it. Consequently, as previously discussed, there are no power-dependent reflections and the output pump power is not limited to the threshold power; in fact, 100 percent conversion of pump power into signal and idler power occurs at finite power levels. This point is quantitatively illustrated in FIG. 4 by curve 72.

The curves show the efficiency with which pump power is converted into signal and idler power as a function of $P/P_t$, the ratio of input pump power to threshold pump power. Curve 71 shows the corresponding relationship for a DRO (i.e., a parametric oscillator with simultaneous signal and idler resonance) with power-dependent reflections. It is characterized by maximum theoretical efficiency of 50 percent at $P/P_t=4.00$. By way of contrast, curve 72 shows that the SRO of the present invention attains a maximum theoretical efficiency of 100 percent at lower power input levels, i.e., at $P/P_t=(\pi/2)^2=2.46$. With an SRO embodiment like that of FIG. 3, described below, we have discovered that $P/P_t=2.46$ is readily obtained.

Figure 2:
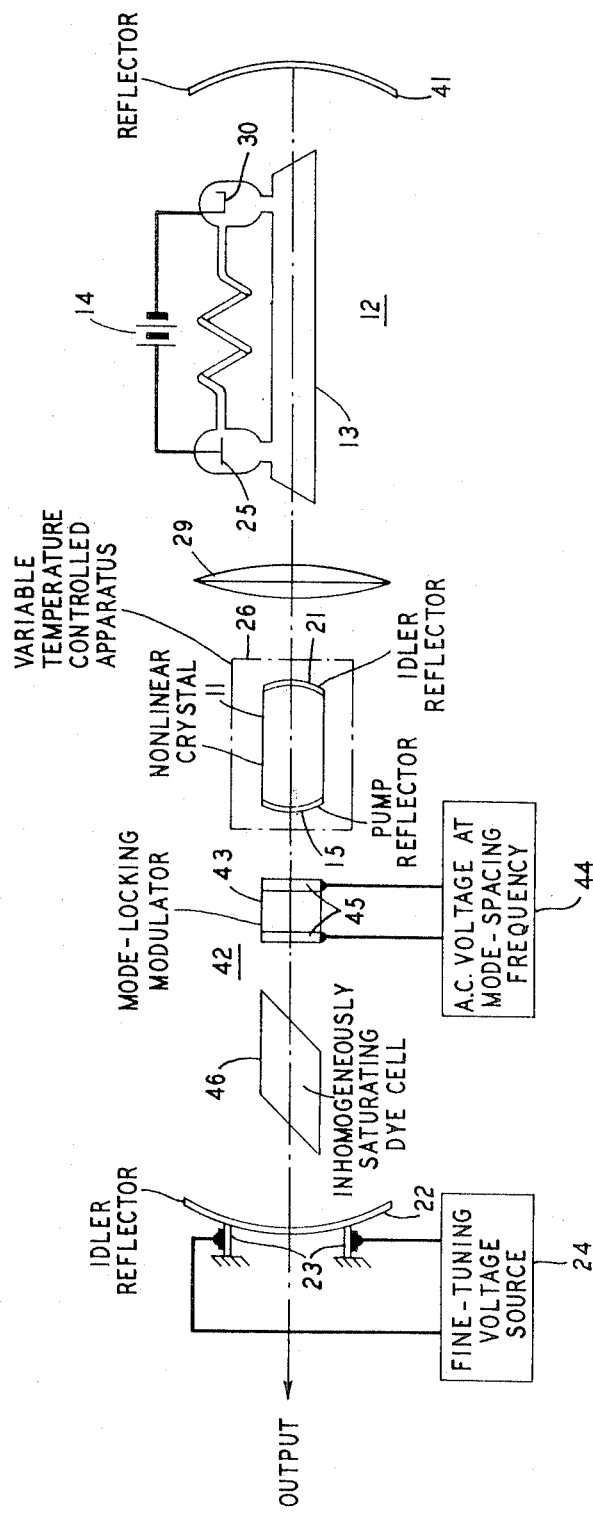
FIG. 2 is a modification of the embodiment of FIG. 1 adapted for mode-locking the parametric oscillator to produce output pulses.

In the modified embodiment of FIG. 2, components numbered the same as those in FIG. 1 are similar thereto. The embodiment of FIG. 2 differs from that of FIG. 1 in that it is adapted for multiple axial mode operation of the pumping laser and mode-locked operation of the parametric oscillator. Mode-locking is brought about by loss modulation of the idler resonator at the parametric oscillator mode-spacing frequency.

The modulator 42 could be comprised of a lithium tantalate ($LiTaO_3$) electro-optic crystal 43 oriented with its optic axis parallel to the common resonator axis. It is driven by voltage source 44 at the mode-spacing frequency illustratively through the transparent end electrodes 45. Loss is varied because of rotation of the plane of the light polarization and resulting variation of loss at Brewster-angle surfaces.

It is one advantage of the embodiment of FIG. 2 that the pumping power level may be raised so high within crystal 11 that bandwidth of the parametric oscillator is many times greater than the oscillation bandwidth of the pumping laser. For reasonable idler resonator dimension, the mode-spacing frequency may be $$c/2L \approx 4 \times 10^9 \text{c.p.s.} = 4 \text{gHz}$$

nevertheless, there will be many permissible idler axial modes within the oscillation bandwidth. In order to insure that the homogeneous-saturation characteristic of crystal 11 does not quench too many of these modes, one can mount an inhomogeneously-saturating absorption cell 46 of known type, such as a cell containing Eastman 9860 or 9740 (trade names) Q-switch solution when the idler wavelength is $1.06\mu$ within the idler resonator near reflector 22. Inhomogeneous saturation is the property of a gain (or absorption) medium that depletion of the gain (or absorption) at one frequency within the available bandwidth does not tend to deplete the gain (or absorption) at all frequencies within the available gain (absorption) bandwidth. Also, the saturable dye will provide a pulse sharpening mechanism. Note that cell 46 is disposed outside the pump resonator so that it does not affect the pump.

In any event, once a plurality of idler axial modes have been induced to oscillate, mode-locking modulator 42 produces a phase- and mode-locking thereof which forces the radiation output into pulses appearing at the idler mode-spacing rate and having a pulse width inversely related to the number of oscillating axial idler modes.

An optical parametric oscillator may be viewed as having a homogeneous gain profile. This means that in steady-state operation an oscillator pumped by a single-frequency pump will tend to oscillate in a single axial mode of the oscillator resonator. We envision the use of a multimode pump to combat this tendency and the use of appropriate means for promoting mode-locking of the many axial modes, which would produce an output consisting of a train of ultrashort pulses. To promote mode-locking, it is possible to incorporate an intracavity modulator at the $c/2L$ frequency of the oscillator cavity. To assist the pulsing further, it is desirable to incorporate a saturable dye cell 46 in the idler resonator near reflector 22. Its operation can be understood as follows. The modulator forces the oscillator to oscillate over the bandwidth of the modulator, producing pulses about as long as the reciprocal of that bandwidth. However, electronic circuits do not achieve the fantastically wide bandwidth and ultrashort pulses we desire. They can only help us along the way. To make the pulses shorter, the dye cell 46 is employed as a pulse sharpening mechanism. Alternatively, the dye can be viewed as a modulator having an exceptionally large bandwidth. Thus, the dye is used in the same fashion that dyes are used to produce mode-locking in Nd:glass and ruby lasers. The modulator is simple employed to insure that the desired mode-locking does take place.

In contrast, a parametric oscillator in which both the signal and idler are resonated is not a good candidate for producing mode-locked operation. The reason is that the effective gain curve for such an oscillator is not a smooth, slowly varying curve. Instead, there are clusters of axial modes spaced many axial modes apart for which there is high gain. The possibility of causing an oscillator with such complicated gain conditions (because of complicated resonance) to mode lock is not known. For an oscillator with a nonresonant signal, such as that of FIG. 2, no such complications arise.

It should be apparent that other embodiments of our invention are feasible. For example, we have conducted successful experiments in which the nonlinear crystal was placed outside of the pumping laser resonator and provided with reflectors adapted to resonate the idler and transmit the signal without reflection. In one such experiment we used a $LiNbO_3$ nonlinear crystal and a pulsed single mode ruby laser pump source ($0.6943\mu$). Parametric oscillations with a supplied pump power of 630 kw. was readily obtained at an idler wavelength of $1.04\mu$ and a signal wavelength of $2.08\mu$.

For experimental convenience we measured the idler power at about $1.04\mu$ coupled out of the oscillator through a 98 percent reflecting mirror and found it to be 41 kw. The nonresonant signal power at about $2.08\mu$ can be inferred to be considerably larger. Because we measured the resonated radiation, which is herein called the idler, it may be more conventional to reverse the signal and idler terminology in such a case.

With minor experimental improvement, considerable improvement in output has been obtained. Thus, for a nonresonant signal at $1.06\mu$, a resonant idler at about $1.99\mu$ and 900 kw. of pump power, we measured the signal power to be 250 kw., which represents a *signal* conversion efficiency of 28 percent. Of course, some of the pump power was also converted to idler power so that the overall efficiency is even higher.

Figure 3:
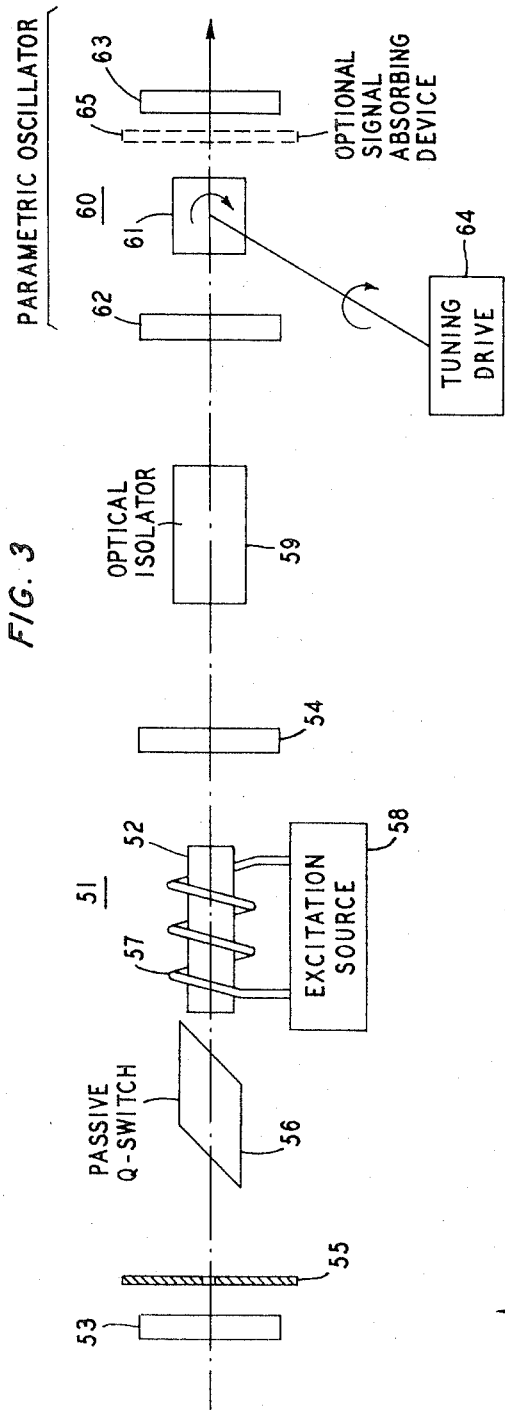
FIG. 3 is an embodiment of an oscillator with nonlinear crystal disposed outside of the pump laser cavity; and, FIG. 4 shows curves that are helpful in understanding the operation of the invention.

Thus, in the embodiment of FIG. 3, which is based on our experiments, we illustrate an optical parametric oscillator 60 employing a nonresonant signal. The oscillator 60 is placed external to the resonator of the pulsed pump laser 51. The pumping laser is a single longitudinal- and transverse-mode giant pulse ruby laser 51 having planar reflectors 53 and 54. A single mode pump is chosen since such a choice assures reproducible results; with a multimode pump irregular results might be obtained. The laser resonator is formed by the highly reflecting flat mirror 53 and the partially transmitting (T $\approx$ 70 percent) mirror 54. Transverse mode control is achieved by introducing a 2 mm. aperture in a 1/16-inch thick stainless steel plate 55 and longitudinal mode control and Q-switching is affected by the bleachable-dye Q switch (cryptocyanane in methanol) 56, which, for this purpose is disposed near the laser active medium 52. The excitation source 58 is adjusted relative to the dye concentration so that a single Q-switched pulse is obtained.

The parametric oscillator resonator is formed by mirrors 62 and 63 which are highly transmitting for pump light and highly reflecting for the idler. Mirror 63 is highly transmitting for the signal and 62 may have arbitrary reflectivity for the signal, since no signal propagating to the left can be generated. In order to eliminate the small reflections off the oscillator mirrors from feeding pump radiation back into the pump resonator, an optical isolator 59 is placed between the pump and the oscillator. This could be comprised of a Faraday rotator placed between crossed polarizers. Coarse tuning of the oscillator can be accomplished by rotating the crystal, e.g., through a tuning drive 64, controlling its temperature, applying an electric field, or by pressure. As illustrated here, the oscillator will be an efficient source of tunable pulses of radiation. However, by adding a loss modulator and a saturable dye for pulse sharpening to the oscillator resonator, as described for the embodiment of FIG. 2, mode-locking of the oscillator modes can be achieved and the signal output will consist of a train of ultrashort pulses.

Clearly there are other embodiments that one can devise in which the optical parametric oscillator is operated with a nonresonant signal. One example of other means of achieving nonresonant signals includes using broadband relatively high-reflectivity mirrors with a signal-absorbing device 65 placed internal to the cavity. Such a device 65 was not used in our experiments and is purely optional. It would be used primarily when no use is to be made of the signal radiation or when device 65 is itself a utilization device. It is, of course, apparent that a portion of the resonated idler radiation may be coupled out for utilization.

What is claimed is:

1. An optical parametric oscillator comprising a body of optically nonlinear material, means for supplying electromagnetic optical pumping radiation at a fixed frequency to said body to generate by traveling wave parametric interaction signal and idler electromagnetic optical radiations of differing frequencies therein, frequency-selective means disposed about said body for resonating said idler radiation, and means for nonresonantly extracting substantially all of said signal radiation from said resonating means.

2. An optical parametric oscillator according to claim 1 in which the ratio of the power of the pumping radiation to the threshold power of said nonlinear material is about $(\pi/2)^2$.

3. An optical parametric oscillator according to claim 1 in which the frequency-selective resonating means comprise opposed multiple-dielectric reflectors having substantial reflectivity for the idler radiation and negligible reflectivity for the signal disposed about the body of nonlinear material.

4. An optical parametric oscillator according to claim 3 in which the means for supplying pumping radiation comprises a pumping laser including opposed reflectors forming a pump resonator, the body of optically nonlinear material being disposed within said pump resonator and in which at least one reflector of said pump resonator is highly transmitting for the signal.

5. An optical parametric oscillator according to claim 4 including means for varying the temperature of the body of optically nonlinear material to tune the parametric oscillator and including within the pump resonator means for compensating the optical path length of the pump resonator against change as a result of said change in temperature.

6. An optical parametric oscillator according to claim 4 in which the pumping laser and the frequency-selective resonating means are adapted to provide a plurality of oscillating idler modes, and including means for mode-locking said oscillating idler modes.

7. An optical parametric oscillator according to claim 3 in which the body of nonlinear material is a crystal composed of phase-matchable material, the means for supplying pumping radiation is a pulsed laser adapted to supply pumping radiation in only one direction in said crystal, and the frequency-selective resonating means includes two reflectors, the one of said reflectors farther removed from said pulsed laser being highly transmissive to the signal radiation.

* * * * *

Disclaimer 3,628,186.—*Arthur Ashkin*, Rumson, and *John E. Bjorkholm*, Middletown, N.J. PARAMETRIC OSCILLATOR WITH NONRESONANT SIGNAL. Patent dated Dec. 14, 1971. Disclaimer filed July 17, 1972, by the assignee, *Bell Telephone Laboratories, Incorporated*.

Hereby enters this disclaimer to claim 2 of said patent.

[*Official Gazette January 30, 1973.*]